(12) United States Patent
Haga et al.

(10) Patent No.: US 11,374,256 B2
(45) Date of Patent: Jun. 28, 2022

(54) METHOD FOR PRODUCING ALL SOLID STATE BATTERY, AND ALL SOLID STATE BATTERY

(71) Applicant: Toyota Jidosha Kabushiki Kaisha, Toyota (JP)

(72) Inventors: Kengo Haga, Susono (JP); Hideki Asadachi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/292,485

(22) Filed: Mar. 5, 2019

(65) Prior Publication Data
US 2019/0280328 A1    Sep. 12, 2019

(30) Foreign Application Priority Data
Mar. 12, 2018 (JP) .............................. JP2018-044285

(51) Int. Cl.
*H01M 10/0562* (2010.01)
*H01M 10/04* (2006.01)
*H01M 10/0525* (2010.01)
*H01M 4/40* (2006.01)

(52) U.S. Cl.
CPC ....... *H01M 10/0562* (2013.01); *H01M 4/405* (2013.01); *H01M 10/0468* (2013.01); *H01M 10/0525* (2013.01); *H01M 2300/0068* (2013.01)

(58) Field of Classification Search
CPC ......... H01M 10/0562; H01M 10/0468; H01M 10/0525; H01M 2300/0068; H01M 4/405
See application file for complete search history.

(56) References Cited

U.S. PATENT DOCUMENTS

| 2005/0130039 A1* | 6/2005 | Shimizu | B23D 19/04 |
| | | | 429/217 |
| 2011/0065007 A1* | 3/2011 | Kamiya | H01M 10/0562 |
| | | | 429/322 |
| 2011/0162198 A1 | 7/2011 | Kawamoto et al. | |
| 2017/0207482 A1 | 7/2017 | Tomura et al. | |
| 2019/0181432 A1* | 6/2019 | Yui | H01M 4/0435 |

FOREIGN PATENT DOCUMENTS

| CN | 102122711 A | | 7/2011 | |
| JP | 2011-142007 A | | 7/2011 | |
| JP | 2014-127272 | * | 7/2014 | ........ H01M 10/0585 |
| JP | 2017-130281 A | | 7/2017 | |
| JP | 2019-067572 A | | 4/2019 | |

* cited by examiner

*Primary Examiner* — Osei K Amponsah
(74) *Attorney, Agent, or Firm* — Dinsmore & Shohl LLP

(57) ABSTRACT

A method for producing an all solid state battery in which an anode foil, an anode layer, a solid electrolyte layer, and a cathode layer are layered in this order, and an area of the solid electrolyte layer and the anode layer is larger than an area of the cathode layer is disclosed. The method includes a first pressing step of roll-pressing a first layered body so an adhesive force between the anode foil and the anode layer becomes 30 N/cm$^2$ or more, to form a second layered body; a layered body forming step of forming a third layered body comprising the anode foil, the anode layer, the solid electrolyte layer, and the cathode layer, using the second layered body; and a second pressing step of roll-pressing the third layered body with a linear pressure of 1.0 t/cm or more to form a forth layered body.

8 Claims, 10 Drawing Sheets

METHOD FOR PRODUCING ALL SOLID STATE BATTERY, AND ALL SOLID STATE BATTERY

CROSS REFERENCE TO RELATED APPLICATIONS

The present application claims priority to Japanese Patent Application No. 2018-044285 filed on Mar. 12, 2018, the entire contents of which are hereby incorporated by reference.

TECHNICAL FIELD

The present disclosure relates to a method for producing an all solid state battery, and an all solid state battery.

BACKGROUND ART

An all solid state battery is a battery including a solid electrolyte layer between an anode layer and a cathode layer, and one of the advantages thereof is that the simplification of a safety device may be more easily achieved compared to a liquid-based battery including a liquid electrolyte containing a flammable organic solvent. Patent Literature 1 discloses a technique of roll-pressing a layered body in which a first active material layer, a solid electrolyte layer, and a second active material layer are layered on both of the surface and the rear surface of a first current collector.

CITATION LIST

Patent Literatures

Patent Literature 1: Japanese Patent Application Laid-Open (JP-A) No. 2017-130281

SUMMARY OF DISCLOSURE

Technical Problem

An all solid state battery is, for example, as shown in FIG. 13A, designed so as the area of solid electrolyte layer 3 and anode layer 2 becomes larger than the area of cathode layer 4 in some cases. In all solid state battery 10' designed in such a manner, when the all solid state battery is driven, even if the active material is expanded or contracted, a problem such as anode layer 2 contacting with cathode layer 4 causes short circuit can be inhibited. Here, as shown in FIG. 13A, in planar view, the region that overlaps with cathode layer 4 is determined as central part X, and the region that does not overlap with cathode layer 4 is determined as end part Y.

As shown in FIGS. 13A and 13B, when the area of solid electrolyte layer 3 and anode layer 4 is larger than the area of cathode layer 4, when it is roll-pressed, solid electrolyte layer 3 and anode layer 2 are easily slipped off from anode foil 1 in end part Y.

The present disclosure has been made in view of the above circumstances, and a main object thereof is to provide a method for producing an all solid state battery with which the slippage of a solid electrolyte layer and an anode layer from an anode foil can be inhibited.

Solution to Problem

In order to achieve the object, the present disclosure provides a method for producing an all solid state battery to produce an all solid state battery in which an anode foil, an anode layer, a solid electrolyte layer, and a cathode layer are layered in this order, and an area of the solid electrolyte layer and the anode layer is larger than an area of the cathode layer; the method comprising: a first pressing step of roll-pressing a first layered body that is a layered body in which the anode foil and the anode layer are layered, or a layered body in which the anode foil, the anode layer, and the solid electrolyte layer are layered, so as adhesive force between the anode foil and the anode layer becomes 30 N/cm$^2$ or more, to form a second layered body; a layered body forming step of forming a third layered body comprising the anode foil, the anode layer, the solid electrolyte layer, and the cathode layer, using the second layered body; and a second pressing step of roll-pressing the third layered body with a linear pressure of 1.0 t/cm or more to form a fourth layered body.

The present disclosure can provide a method for producing an all solid state battery with which the slippage of a solid electrolyte layer and an anode layer from an anode foil can be inhibited.

In the present disclosure, the first pressing step may be a step of roll-pressing with a linear pressure of 1.0 t/cm or more.

In the present disclosure, the second pressing step may be a step of roll-pressing with a linear pressure of 5.0 t/cm or less.

The present disclosure also provides an all solid state battery comprising an anode foil, an anode layer, a solid electrolyte layer, and a cathode layer, layered in this order, and an area of the solid electrolyte layer and the anode layer is larger than an area of the cathode layer; wherein a filling rate of the anode layer is 80% or more; a filling rate of the solid electrolyte layer is 70% or more; a filling rate of the cathode layer is 75% or more; and the solid electrolyte layer extends to all an outer peripheral part of the cathode layer in planar view.

The present disclosure can provide an all solid state battery with which the slippage of a solid electrolyte layer and an anode layer from an anode foil can be inhibited.

In the present disclosure, an adhesive force between the anode foil and the anode layer may be 30 N/cm$^2$ or more.

In the present disclosure, the solid electrolyte layer may extend 100 μm or more to all an outer peripheral part of the cathode layer in planar view.

Advantageous Effects of Disclosure

The present disclosure exhibits an effect of providing a method for producing an all solid state battery with which the slippage of a solid electrolyte layer and an anode layer from an anode foil can be inhibited.

DESCRIPTION OF EMBODIMENTS

The method for producing an all solid state battery and the all solid state battery of the present disclosure are hereinafter explained in details.

A. Method for Producing all Solid State Battery

The method for producing an all solid state battery is a method for producing an all solid state battery to produce an all solid state battery in which an anode foil, an anode layer, a solid electrolyte layer, and a cathode layer are layered in this order, and an area of the solid electrolyte layer and the anode layer is larger than an area of the cathode layer; the method comprising: a first pressing step of roll-pressing a first layered body that is a layered body in which the anode foil and the anode layer are layered, or a layered body in which the anode foil, the anode layer, and the solid electrolyte layer are layered, so as adhesive force between the anode foil and the anode layer becomes 30 N/cm$^2$ or more, to form a second layered body; a layered body forming step of forming a third layered body comprising the anode foil, the anode layer, the solid electrolyte layer, and the cathode layer, using the second layered body; and a second pressing step of roll-pressing the third layered body with a linear pressure of 1.0 t/cm or more to form a fourth layered body.

Figure 1A:
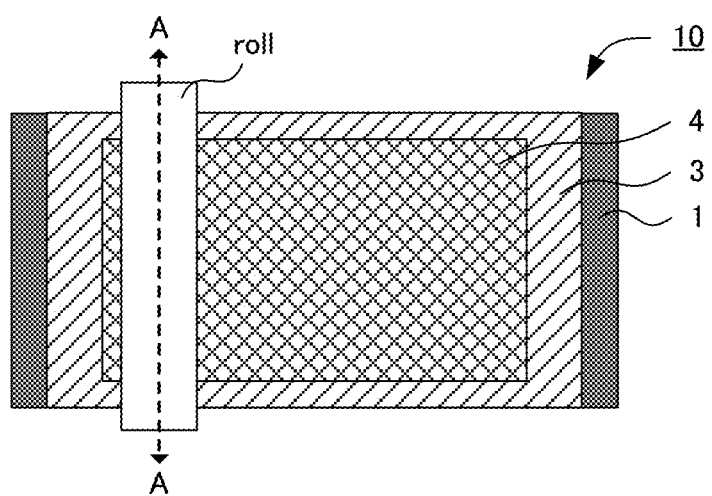
FIGS. 1A and 1B are explanatory drawing explaining the method for producing an all solid state battery of the present disclosure.
Figure 1B:
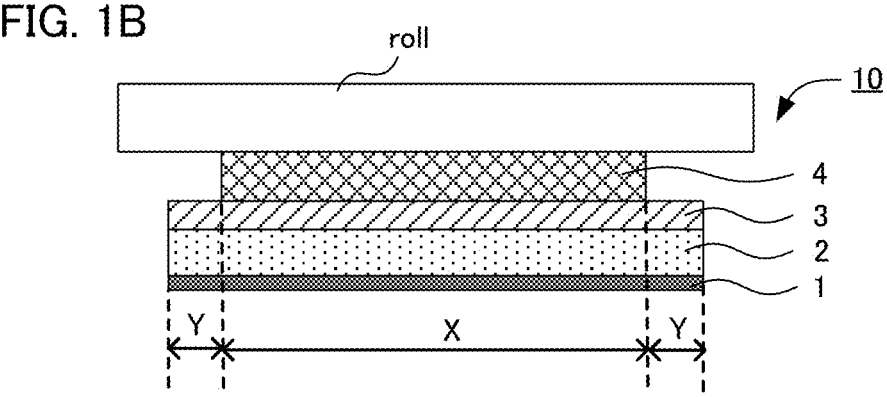

FIG. 1A is a schematic planar view illustrating an example of the all solid state battery to be obtained by the method for producing the all solid state battery of the present disclosure, and FIG. 1B is a cross-sectional view of line A-A in FIG. 1A. As shown in FIGS. 1A and 1B, in all solid state battery 10 to be obtained by the method for producing the all solid state battery of the present disclosure, the slippage of anode layer 2 from anode foil 1 in end part Y can be inhibited when it is roll-pressed. Incidentally, if anode layer 2 is slipped off from anode foil 1, solid electrolyte layer 3 on the anode layer 2 would be also slipped off along with the slipped anode layer 2. The method for producing the all solid state battery of the present disclosure in detail is as follows.

Figure 2:
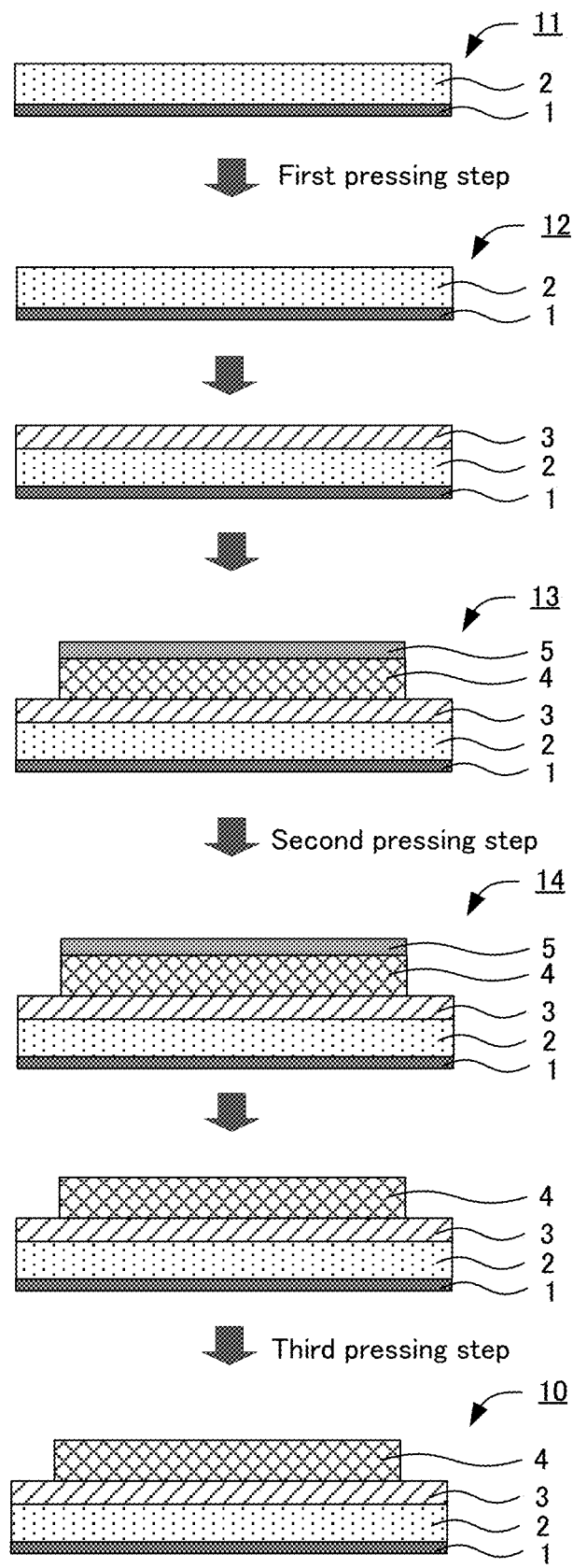
FIG. 2 is a process drawing that shows an example of the method for producing an all solid state battery of the present disclosure.

FIG. 2 is a schematic process drawing that shows an example of the method for producing the all solid state battery of the present disclosure. As shown in FIG. 2, the method for producing the all solid state battery of the present disclosure is a method to produce all solid state battery 10 comprising anode foil 1, anode layer 2, solid electrolyte layer 3, and cathode layer 4 being layered in this order wherein the area of solid electrolyte layer 3 is larger than the area of cathode layer 4. Also, the method for producing the all solid state battery of the present disclosure comprises: as shown in FIG. 2, a first pressing step of roll-pressing first layered body 11 that is a layered body in which anode foil 1 and anode layer 2 are layered, so as the adhesive force between anode foil 1 and anode layer 2 becomes 30 N/cm$^2$ or more; a layered body forming step of forming third layered body 13 comprising anode foil 1, anode layer 2, solid electrolyte layer 3, and cathode layer 4, using second layered body 12; and a second pressing step of roll-pressing third layered body 13 with a linear pressure of 1.0 t/cm or more to form fourth layered body 14. Incidentally, the example shown in FIG. 2 is an example of forming cathode layer 4 by a transfer method; the member shown with reference sign 5 indicates a transfer foil. Thus, the second pressing step in the example shown in FIG. 2 is a roll-pressing step to transfer the cathode layer. Also, the example shown in FIG. 2 is an example comprising, after the second pressing step, a third pressing step of roll-pressing fourth layered body 14 to densify the electrode layer after removing transfer foil 5 from cathode layer 4.

Figure 3:
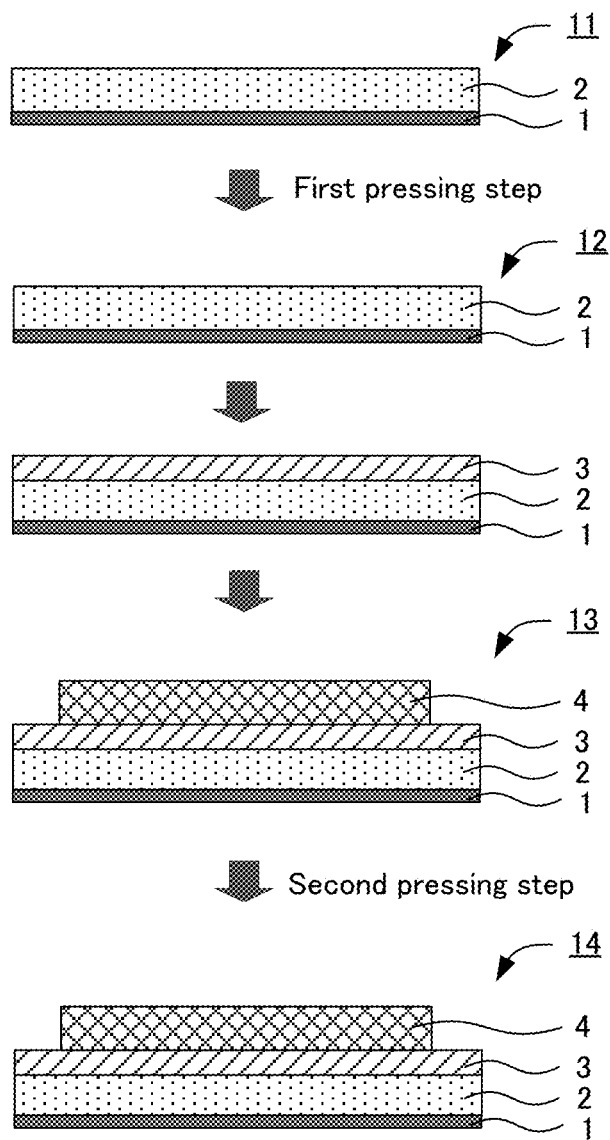
FIG. 3 is a process drawing that shows an additional example of the method for producing an all solid state battery of the present disclosure.

FIG. 3 is a schematic process drawing that shows an additional example of the method for producing the all solid state battery of the present disclosure. The method for producing the all solid state battery shown in FIG. 2 comprises a first pressing step in the same manner as in the method for producing the all solid state batter shown in FIG. 2. Meanwhile, the method for producing the all solid state battery shown in FIG. 3 comprises: a layered body forming step of forming third layered body 13 comprising anode foil 1, anode layer 2, solid electrolyte layer 3, and cathode layer 4, using second layered body 12, after the first pressing step; and a second pressing step of roll-pressing third layered body 13 with a linear pressure of 1.0 t/cm$^2$ or more to form fourth layered body 14. Incidentally, the example shown in FIG. 3 is an example of forming cathode layer 4 by, for example, a paint-on method. Thus, in the example shown in FIG. 3, the second pressing step is a step of roll-pressing third layered body 13 to densify the electrode layer. Also, although not illustrated, the method for producing the all solid state battery shown in FIG. 3 may comprise a third pressing step after the second pressing step as required.

Figure 4:
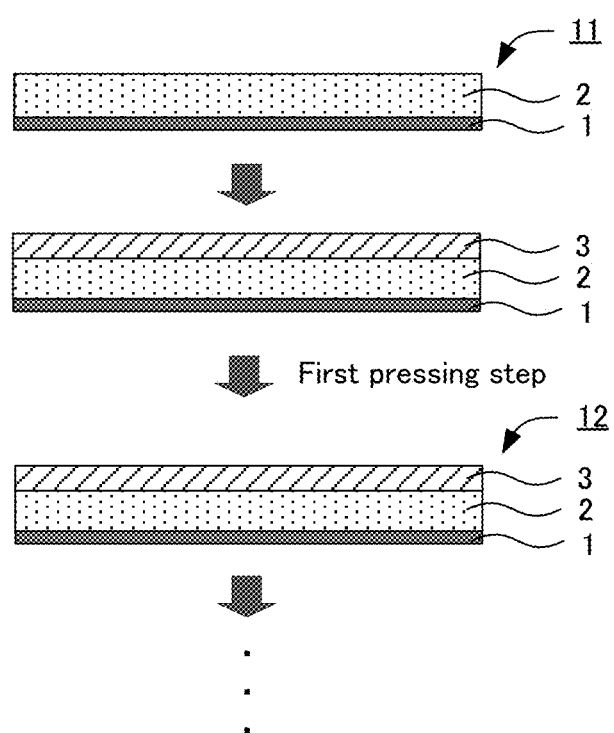
FIG. 4 is a process drawing that shows an additional example of the method for producing an all solid state battery of the present disclosure.

FIG. 4 is a schematic process drawing that shows an additional example of the method for producing the all solid state battery of the present disclosure. The method for producing the all solid state battery shown in FIG. 4 comprises: a first pressing step of roll-pressing first layered body 11 that is a layered body in which anode foil 1, anode layer 2, and solid electrolyte layer 3 are layered, so as the adhesive force between anode foil 1 and anode layer 2 becomes 30 N/cm$^2$ or more, to form second layered body 12. Incidentally, steps such as the layered body forming step of forming a third layered body using second layered body 12 shown in FIG. 4 and the second pressing step of roll-pressing the third layered body to form fourth layered body may be in the same manner as in the layered body forming step and the second pressing step shown in FIG. 2, and may be in the same manner as in the layered body forming step and the second pressing step shown in FIG. 3; thus, the layered body forming step and the step thereafter are omitted in FIG. 4.

Figure 12A:
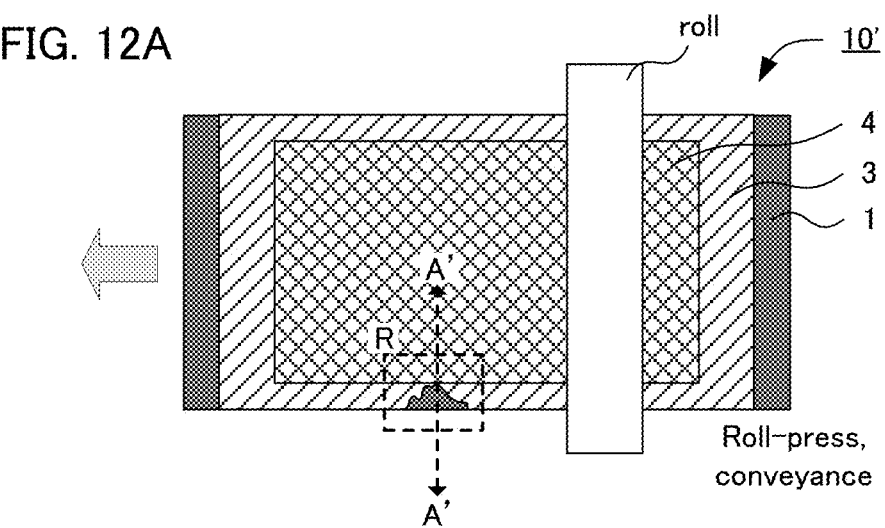
FIGS. 12A to 12C are explanatory drawings to explain the "slippage" in the present disclosure.
Figure 12B:
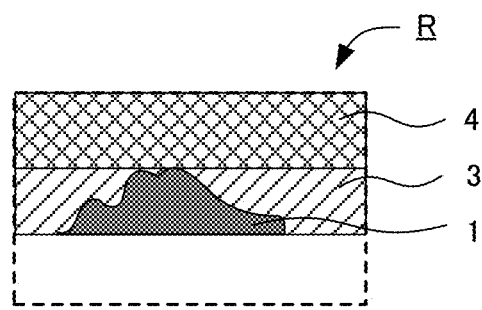
Figure 12C:
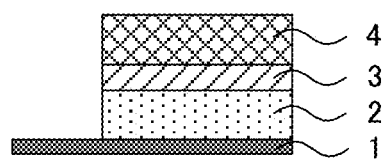
Figure 13A:
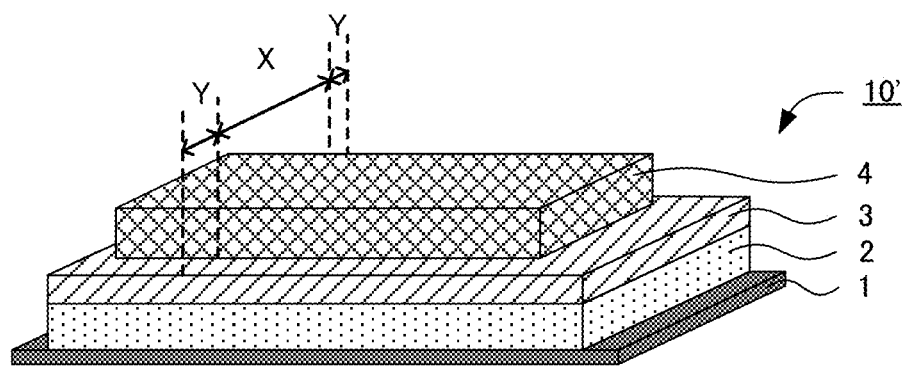
FIGS. 13A and 13B are schematic process drawings that show an example of the conventional method for producing an all solid state battery.
Figure 13B:
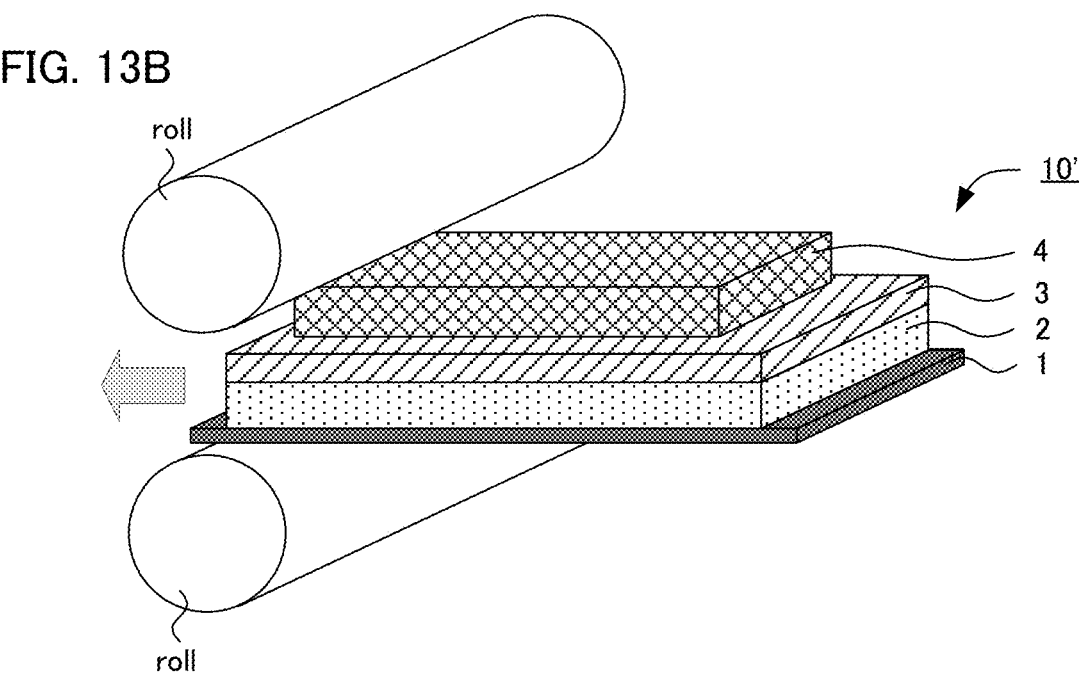

Now, Patent Literature 1 discloses a technique of roll-pressing an all solid state battery to improve performance of the all solid state battery. In specific, as shown in FIG. 13B, the technique is to roll-press the all solid state battery in which anode foil 1, anode layer 2, solid electrolyte layer 3, and cathode layer 4 are layered in this order. On the other hand, as described above, all solid state battery 10' is designed so as the area of solid electrolyte layer 3 and anode layer 2 becomes larger than the area of cathode layer 4 in some cases. In that case, as shown in FIG. 13B, when roll-pressing, the central part indicated by reference sign X where cathode layer 4 is layered contacts with the roll-press, but end part Y other than the central part X does not contact the roll-press. As the result, for example, as shown in FIGS. 12A to 12C, a problem occurs such that anode layer 2 and solid electrolyte layer 3 slip off from anode foil 1 and anode foil 1 is exposed. When such a problem occurs, there is a risk that anode layer 2 contacts with cathode layer 4 to cause short circuit. FIG. 12A is a schematic planar view of all solid state battery 10', FIG. 12B is an enlarged view of region R marked by a broken line in FIG. 12A, and FIG. 12C is a cross-sectional view of line A'-A' in FIG. 12A.

One of the reasons why anode layer 2 and solid electrolyte layer 3 are slipped off from anode foil 1 due to roll-pressing the all solid state battery as shown in FIGS. 12A to 12C for example is presumed as follows. First, anode foil 1 is a member with a comparatively hard property. On the other hand, anode layer 2 and solid electrolyte layer 3 before being pressed by means such as roll-pressing are members with low filling rates and soft properties. Here, both of anode layer 2 and solid electrolyte layer 3 are members with soft properties; thus, even when comparatively weak pressure is applied thereto, there is a tendency that high adhesive force can be obtained. However, like anode foil 1 and anode layer 2, when one member has a hard property and the other member has a soft property, there is a tendency that desired adhesive force cannot be obtained only by applying comparatively weak pressure. In this manner, in an all solid state battery obtained by a conventional production method, it can be said that the adhesive force between anode foil 1 and anode layer 2 is low. Accordingly, a problem as follows presumably arises. That is, for example, by roll-pressing, just the central part X in cathode layer 4, anode layer 2, and solid electrolyte layer 3 is pressurized and as the result, the central part X of cathode layer 4, anode layer 2, and solid electrolyte layer 3 is deformed toward the surface side. Meanwhile, the end parts Y of anode layer 2 and solid electrolyte layer 3 do not overlap with cathode layer 4; thus, for example, as shown in FIG. 13B, would not be roll-pressed. Then, shear force difference would be generated between the central part X and the end part Y of anode layer 2 and solid electrolyte layer 3 to presumably raise the problem of the slippage of anode layer 2 from anode foil 1. Incidentally, if anode layer 2 slipped off from anode foil 1, solid electrolyte layer 3 on anode layer 2 would also be slipped off along with slipped anode layer 2.

Now, the inventors of the present disclosure have attempted to solve the above described problem by improving the adhesive force between the anode foil and the anode layer. In specific, the method for producing the all solid state battery of the present disclosure comprises a first pressing step of roll-pressing a first layered body that is a layered body in which an anode foil and anode layer are layered, or a layered body in which an anode foil, an anode layer, and a solid electrolyte layer are layered, so as the adhesive force between the anode foil and the anode layer becomes 30 N/cm$^2$ or more, to form a second layered body. The first pressing step allows the adhesive force between the anode foil and the anode layer to improve. Accordingly, after the first pressing step and when conducting a second roll-pressing step to roll-press a third layered body in which an anode foil, an anode layer, a solid electrolyte layer, and a cathode layer are layered, the slippage of the anode layer and the solid electrolyte layer from the anode foil can be inhibited in the end part of the anode layer and the solid electrolyte layer.

Each step included in the method for producing the all solid state battery is hereinafter explained.

1. First Pressing Step

The first pressing step is a step of roll-pressing a first layered body that is a layered body in which an anode foil and anode layer are layered, or a layered body in which an anode foil, an anode layer, and a solid electrolyte layer are layered, so as the adhesive force between the anode foil and the anode layer becomes 30 N/cm$^2$, to form a second layered body.

The "first layered body" in the present disclosure is a layered body in which an anode foil and an anode layer are layered, or a layered body in which an anode foil, an anode layer, and a solid electrolyte layer are layered. Also, the anode foil and the anode layer in the first layered body are in the state before improving the adhesive force between the anode foil and the anode layer by the first pressing step; thus, the adhesive force between the anode foil and the anode layer is in a low state. In specific, the adhesive force between the anode foil and the anode layer in the first layered body is, for example, less than 30 N/cm$^2$, 20 N/cm$^2$ or less, or 10 N/cm$^2$ or less. Also, the "second layered body" in the present disclosure is a layered body after roll-pressing the above described first layered body by the first pressing step. Thus, the adhesive force between the anode foil and the anode layer in the second layered body is 30 N/cm$^2$ or more as specified in the present disclosure. Also, the second layered body is a layered body after roll-pressing the first layered body by the first pressing step; thus, may be a layered body of an anode foil and an anode layer, and may be a layered body of an anode foil, an anode layer, and a solid electrolyte layer.

The first pressing step may be a step of roll-pressing the first layered body in which the anode foil and the anode layer are layered, and may be a step of roll-pressing the first layered body in which the anode foil, the anode layer, and the solid electrolyte layer are layered. In the former case, the first pressing step comprises, as shown in FIGS. 2 and 3 for example, a step of layering solid electrolyte layer 3 on the surface of anode layer 2 opposite to the anode foil 1, as the layered body forming step, after roll-pressing first layered body 11 in which anode foil 1 and anode layer 2 are layered. On the other hand, in the latter case, as shown in FIG. 4, the first pressing step is a step of roll-pressing first layered body 11 in which anode foil 1, anode layer 2, and solid electrolyte layer 3 are layered.

Here, "roll-pressing so as the adhesive force between the anode foil and the anode layer becomes 30 N/cm$^2$ or more" means roll-pressing with a linear pressure with which the said adhesive force between the anode foil and the anode layer becomes 30 N/cm$^2$ or more when the adhesive force is measured by the method in the same manner as described later in Examples. In some embodiments, the adhesive force between the anode foil and the anode layer is, for example, 40 N/cm$^2$ or more, 46 N/cm$^2$ or more, or 50 N/cm$^2$ or more. When the adhesive force between the anode foil and the anode layer is in the above range, as shown in FIGS. 1A and 1B for example, the slippage of anode layer 2 and solid electrolyte layer 3 from anode foil 1 can be inhibited when the central part X of all solid state battery 10 is roll-pressed in the second pressing step.

In some embodiments, the roll-pressing is conducted with the linear pressure in the level that can obtain the desired adhesive force between the anode foil and the anode layer.

Incidentally, the adhesive force between the anode foil and the anode layer is affected by a temperature condition other than the linear pressure of roll-pressing, thus cannot be specified by just the linear pressure; however, for example, the linear pressure is 1.0 t/cm or more, may be 1.2 t/cm or more, and may be 1.3 t/cm or more. Meanwhile, the linear pressure of roll-pressing may be, for example, 5 t/cm or less.

The roll-pressing may be conducted at a room temperature, and it may be hot roll-pressing conducted under the room temperature or more. In some embodiments, the heating temperature in the hot roll-pressing is the temperature that can improve the adhesive force between the anode foil and the anode layer, and the chemical reaction of the materials included in the anode layer and the solid electrolyte layer do not proceed. The heating temperature in the hot roll-pressing is, for example, 25° C. or more, may be 75° C. or more, and may be 100° C. or more. Meanwhile, the heating temperature in the hot roll-pressing is, for example, 200° C. or less, may be 170° C. or less, and may be 140° C. or less.

There are no particular limitations on the heating method in the hot roll-pressing, and examples thereof may include a method using a heated roll, and a method using a furnace.

In some embodiments, the roll feeding speed in roll-pressing is the speed that can obtain the desired adhesive force between the anode foil and the anode layer. The specific roll feeding speed is, for example, 100 m/min or less, and may be 10 m/min or less. Meanwhile, the roll feeding speed is, for example, 0.1 m/min or more, and may be 0.3 m/in or more.

(1) Anode Foil

The anode foil has a function of collecting currents of the anode layer.

The material to be used in the anode foil may be the material with conductivity such as copper, nickel, stainless, vanadium, manganese, iron, titanium, cobalt, and zinc. The features of the anode foil such as the thickness may be appropriately selected according to the application of the all solid state battery.

(2) Anode Layer

The anode layer is a layer containing at least an anode active material. The anode layer may further contain at least one of a solid electrolyte, a conductive material, and a binder as required.

Examples of the anode active material may include a metal active material and a carbon active material. Examples of the metal active material may include a simple substance of metal and a metal alloy. Examples of the metal element included in the metal substance may include In, Al, Si, and Sn. In some embodiments, the metal alloy is an alloy that contains mainly the above metal elements. Examples of the Si-alloy may include a Si—Al-based alloy, a Si—Sn-based alloy, a Si—In-based alloy, a Si—Ag-based alloy, a Si—Pb-based alloy, a Si—Sb-based alloy, a Si—Bi-based alloy, a Si—Mg-based alloy, a Si—Ca-based alloy, and a Si—Ge-based alloy. Incidentally, for example, the Si—Al-based alloy means an alloy containing at least Si and Al; it may be an alloy containing only Si and Al, and may be an alloy further containing additional metal element. Likewise applies to the alloys other than the Si—Al-based alloy. The metal alloy may be a two-component-based alloy, and may be a multicomponent-based alloy of three components or more. Meanwhile, examples of the carbon active material may include mesocarbon microbeads (MCMB), highly oriented pyrolytic graphite (HOPG), hard carbon, and soft carbon.

Examples of the shape of the anode active material may include a granular shape. The average particle size (D50) of the anode active material is, for example, 10 nm or more, and may be 100 nm or more. Meanwhile, the average particle size (D50) of the anode active material is, for example, 50 μm or less, and may be 20 μm or less. The proportion of the anode active material in the anode layer is, for example, 50 weight % or more, and may be 60 weight % or more. Meanwhile, the proportion is, for example, 99 weight % or less.

The solid electrolyte to be used in the anode layer may be the same material as that described in the section "(3) Solid electrolyte layer" later; thus, the description herein is omitted. Examples of the conductive material to be used in the anode layer may include acetylene black, Ketjen black, carbon nanotube (CNT), and carbon nanofiber (CNF). Examples of the binder may include a fluorine containing binder such as polyvinylidene fluoride (PVdF) and polytetra fluoroethylene (PTFE); butylene rubber (BR); and styrene butadiene rubber (SBR).

The thickness of the anode layer may be, for example, 0.1 μm or more and 1000 μm or less.

The area of the anode layer is larger than the area of the later described cathode layer. Here, "the area of the anode layer is larger than the area of the cathode layer" refers to the state in which the anode layer is not slipped off from the anode foil to the extent not causing short circuit even when the active material is expanded or contracted. In specific, the contents may be the same as those described in "B. All solid state battery" later; thus, the descriptions herein are omitted.

The method for forming the anode layer may be the method with which the anode layer can be formed in a desired thickness and uniform quality, and examples thereof may include general methods. In specific, it may be a method of forming pellet by pressing the material of the anode layer, and may be a method of forming the anode layer by preparing slurry containing the material of the anode layer and a solvent and pasting thereof onto the anode foil in a specific thickness.

(3) Solid Electrolyte Layer

The solid electrolyte layer is formed between the anode layer and the cathode layer. The solid electrolyte layer is a layer containing a solid electrolyte. The solid electrolyte layer may contain a binder as required.

There are no particular limitations on the solid electrolyte if it has ion conductivity. Examples of the solid electrolyte may include a sulfide solid electrolyte, an oxide amorphous solid electrolyte, and crystalline oxide/oxynitride. Examples of the sulfide solid electrolyte may include $Li_2S$—$SiS_2$, $LiI$—$Li_2S$—$SiS_2$, $LiI$—$Li_2S$—$P_2S_5$, $Li_2O$—$Li_2S$—$P_2S_5$, $LiI$—$Li_2O$—$Li_2S$—$P_2S_5$, $LiI$—$Li_2S$—$P_2O_5$, $LiI$—$Li_3PO_4$—$P_2S_5$, $Li_2S$—$P_2S_5$, and $Li_3PS_4$. Examples of the oxide amorphous solid electrolyte may include $Li_2O$—$B_2O_3$—$P_2O_5$, and $Li_2O$—$SiO_2$. Examples of the crystalline oxide/oxynitride may include $LiI$, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}Nw_{(w<1)}$, and $Li_{3.6}Si_{0.6}P_{0.4}O_4$. Incidentally, the description "$Li_2S$—$P_2S_5$" above means a sulfide solid electrolyte comprising a raw material composition including $Li_2S$ and $P_2S_5$, and the likewise applies to the other descriptions.

The solid electrolyte may be a crystalline material and may be an amorphous material. Also, the solid electrolyte may be glass, and may be crystallized glass (glass ceramic). Examples of the shape of the solid electrolyte may include a granular shape.

The binder to be used in the solid electrolyte layer may be the same material as that described in the section "(2) Anode layer" above; thus, the description herein is omitted.

The content of the solid electrolyte in the solid electrolyte layer is, for example, 10 weight % or more, and may be 50 weight % or more. Meanwhile, the content of the solid electrolyte is, for example, 100 weight % or less.

The thickness of the solid electrolyte layer may be, for example, 0.1 μm or more and 1000 μm or less.

The area of the solid electrolyte layer is larger than the area of the later described cathode layer. Incidentally, the regard to the area of the solid electrolyte layer being larger than the cathode layer may be in the same contents as those described in the section "(2) Anode layer" above; thus, the descriptions herein are omitted.

The method for forming the solid electrolyte layer may be the method with which a solid electrolyte layer can be formed in a desired thickness and uniform quality, and examples thereof may include general methods. In specific, the method may be the same as the method for forming the anode layer described above; thus, the description herein is omitted.

2. Layered Body Forming Step

The layered body forming step is a step of forming a third layered body comprising an anode foil, an anode layer, a solid electrolyte layer, and a cathode layer, using the second layered body. Incidentally, the solid electrolyte layer may be in the same contents as those described in the section "1. First pressing step (3) Solid electrolyte layer" above; thus, the descriptions herein are omitted.

The "third layered body" in the present disclosure is a layered body in which an anode foil, an anode layer, a solid electrolyte, and a cathode layer, are layered in this order using the second layered body. Incidentally, for example, as shown in FIG. 2, when cathode layer 4 is formed by a transfer method, third layered body 13 may be a layered body in which anode foil 1, anode layer 2, solid electrolyte layer 3, cathode layer 4, and transfer foil 5 are layered in this order.

The cathode layer is a layer containing at least a cathode active material. The cathode layer may further contain at least one of a solid electrolyte, a conductive material, and a binder, as required.

The cathode active material is selected according to the kind of the all solid state battery, and examples thereof may include an oxide active material and a sulfide active material. Examples of the cathode active material may include a rock salt bed type active material such as lithium cobaltate ($LiCoO_2$), lithium nickelate ($LiNiO_2$), and $LiNi_{1/3}Co_{1/3}Mn_{1/3}O_2$; a spinel type active material such as lithium manganate ($LiMn_2O_4$), $Li(Ni_{0.5}Mn_{1.5})O_4$, and $Li_{1+x}Mn_{2-x-y}M_yO_4$ (M is one or more kind selected from Al, Mg, Co, Fe, Ni, and Zn); and an olivine type active material such as lithium titanate ($Li_xTiO_y$, $LiFePO_4$, $LiMnPO_4$, $LiCoPO_4$, and $LiNiPO_4$.

The solid electrolyte, the conductive material, and the binder to be used in the cathode layer may be in the same contents as those described in the section "1. First pressing step (2) Anode layer" above; thus, the descriptions herein are omitted.

The thickness of the cathode layer may be, for example, 0.1 μm or more and 1000 μm or less.

The area of the cathode layer is smaller than the area of the above described anode layer and solid electrolyte layer. In some embodiments, the area of the cathode layer is appropriately adjusted according to the area of the anode layer and the solid electrolyte layer. Specifically, in some embodiments the cathode layer is formed to be the area so as the ratio to the area of the anode layer and the solid electrolyte layer becomes the ratio described in the section "(2) Anode layer" and "(3) Solid electrolyte layer" above.

The method for forming the cathode layer may be the method with which the cathode layer can be formed in a desired thickness and uniform quality, and examples thereof may include general methods. In specific, it may be the same as the method for forming the anode layer described above; thus, the description herein is omitted.

A coating layer may be formed on the surface of the cathode active material included in the cathode layer. When the coating layer is formed on the surface of the cathode active material, the reaction of the cathode active material with the solid electrolyte layer can be inhibited and thus an all solid state battery with excellent output properties can be obtained. In some embodiments, the material for the coating layer is a material with ion conductivity that does not flow but can maintain the form of the coating layer when it contacts an active material and a solid electrolyte. Examples of the material for the coating layer may include $LiNbO_3$, $Li_3PO_4$, and $Li_4Ti_5O_{12}$. The thickness of the coating layer is, for example, 0.1 nm or more, and may be 1 nm or more. Meanwhile, the thickness of the coating layer is for example, 100 nm or less, and may be 20 nm or less. The coverage of the coating layer on the surface of the cathode active material is, for example 50% or more, and may be 80% or more. Examples of the method for forming the coating layer may include a trembling fluidized bed coating method.

3. Second Pressing Step

The second pressing step is a step of roll-pressing the third layered body with the linear pressure of 1.0 t/cm or more to form a fourth layered body. The linear pressure for roll-pressing in the second pressing step is, for example, 1.5 t/cm or more, may be 2.0 t/cm or more, and may be 3.0 t/cm or more. Meanwhile, the linear pressure for roll-pressing may be, for example, 5.0 t/cm or less.

The "fourth layered body" in the present disclosure is a layered body after roll-pressing the third layered body in the second pressing step. Accordingly, judgement of whether it is a third layered body or a fourth layered body can be done by judging whether it is before or after the cathode layer is roll-pressed. In specific, the filling rate of the cathode layer in the fourth the layered body is in higher state than that of the cathode layer in the third layered body; thus, the judgment can be done by measuring the filling rate of the cathode layer. Incidentally, the filling rate is described in the section "B. All solid state battery" later; thus, the description herein is omitted.

There are no particular limitations on the second pressing step if it is a step of roll-pressing the third body with a linear pressure of 1.0 t/cm or more to form a fourth layered body. An example of the second pressing step may be, a step of pressing to transfer cathode layer 4 as shown in FIG. 2, and a step of pressing to densify each layer that is configured in third layered body 13 as shown in FIG. 3 and FIG. 5.

The second pressing step may be, for example as shown in FIG. 2, a step of pressing third layered body 13 in which anode foil 1, anode layer 2, solid electrolyte layer 3, cathode layer 4, and transfer foil 5 are layered, to transfer cathode layer 4 when cathode layer 4 is formed by a transfer method. When the second pressing step is the step of pressing to transfer the cathode layer, the linear pressure for roll-pressing may be the level with which the cathode layer can be transferred. Specific linear pressure is, for example, 1.2 t/cm or more, and may be 1.3 t/cm or more. Meanwhile, the linear pressure for roll-pressing may be, for example, 2.0 t/cm or less.

Figure 5:
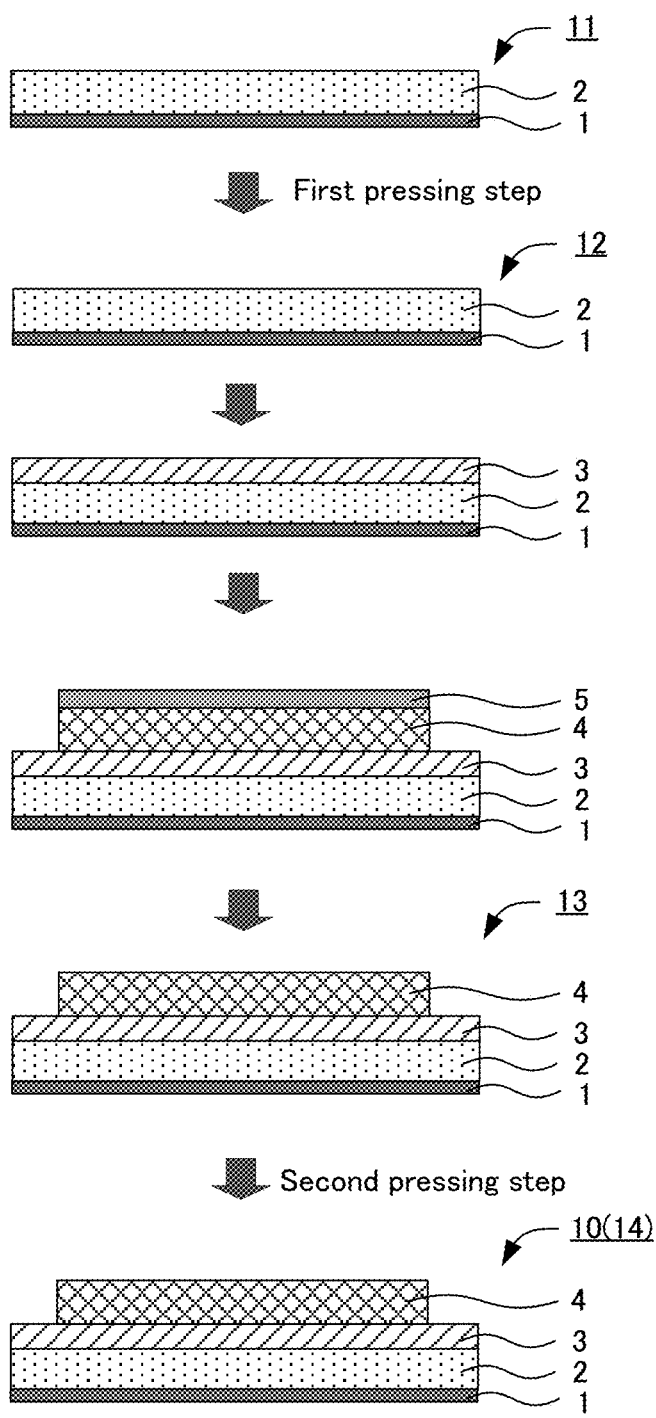
FIG. 5 is a process drawing that shows an additional example of the method for producing an all solid state battery of the present disclosure.

The second pressing step may be, for example, as shown in FIG. 3 and FIG. 5, a step of pressing third layered body 13 in which anode foil 1, anode layer 2, solid electrolyte layer 3, and cathode layer 4 are layered, to densify each layer of third layered body 13. When the second pressing step is the step of pressing to densify each layer configured in third layered body, the linear pressure for roll-pressing may be in the level with which each layer can be densified. Specific linear pressure is, for example, 1.5 t/cm or more, may be 2.0 t/cm or more, and may be 3.0 t/cm or more. Meanwhile, the linear pressure for roll-pressing may be, for example, 5.0 t/cm or less. When the second pressing step is the step of pressing to densify each layer configured in the third layered body, as required, an additional pressing step may be conducted before the second pressing step. For example, as shown in FIG. 5, a pressing step to transfer cathode layer 4, can be conducted when cathode layer 4 is formed by a transfer method before the second pressing step. It means that after the first pressing step, solid electrolyte layer 3, cathode layer 4, and transfer foil 5 may be layered on second layered body 12 and the layered body may be roll-pressed. The linear pressure for roll-pressing in the pressing step to transfer cathode layer 4 in this occasion is, for example, 0.2 t/cm or more, and may be 0.5 t/cm or more. Meanwhile, the linear pressure in the pressing step to transfer the cathode layer 4 may be, for example, less than 1 t/cm.

The roll-pressing may be hot roll-pressing. Incidentally, the hot roll-pressing may be in the same contents as those described in the section "1. First pressing step" above; thus, the descriptions herein are omitted. Also, the roll feeding speed of roll-pressing may be in the same contents as those described in the section "1. First pressing step" above; thus, the descriptions herein are omitted.

4. Third Pressing Step

In the present disclosure, a third pressing step may be conducted after the second pressing step as required. The third pressing step is a step of roll-pressing the fourth layered body. In the present disclosure, for example, the third pressing step may be conducted in a case as follows: as shown in FIG. 2, when cathode layer 4 is formed by a transfer method and the above described second pressing step is a step of pressing to transfer cathode layer 4, after the second pressing step, for example, the third pressing step to densify each layer configured in the fourth layered body may be conducted. The linear pressure in the third pressing step at this time may be higher linear pressure than that in the second pressing step. The linear pressure for roll-pressing in the third pressing step is, for example, 1.0 t/cm or more, may be 1.5 t/cm or more, may be 2.0 t/cm or more, may be 3.0 t/cm or more, and may be 4.0 t/cm or more. Meanwhile, the linear pressure for roll-pressing may be, for example, 5.0 t/cm or less.

The details of roll-pressing in the third pressing step may be in the same contents as those described in the section "2. Second pressing step" above; thus, the descriptions herein are omitted.

B. All Solid State Battery

The all solid state battery of the present disclosure is an all solid state battery comprising an anode foil, an anode layer, a solid electrolyte layer, and a cathode layer, layered in this order, and an area of the solid electrolyte layer and the anode layer is larger than an area of the cathode layer; wherein a filling rate of the anode layer is 80% or more; a filling rate of the solid electrolyte layer is 70% or more; a filling rate of the cathode layer is 75% or more; and the solid electrolyte layer extends to all an outer peripheral part of the cathode layer in planar view.

Figure 6:
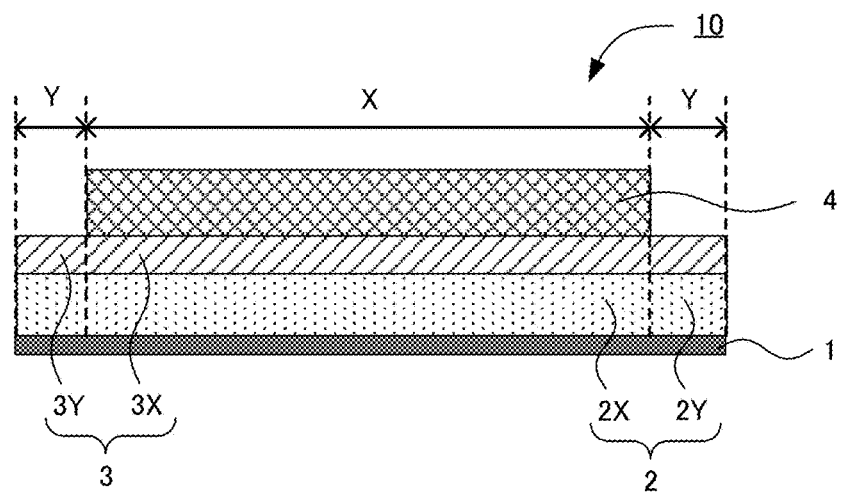
FIG. 6 is a schematic cross-sectional view illustrating an example of the all solid state battery of the present disclosure.

FIG. 6 is a schematic cross-sectional view illustrating an example of the all solid state battery of the present disclosure. As shown in FIG. 6, all solid state battery 10 of the present disclosure comprises anode foil 1, anode layer 2, solid electrolyte layer 3, and cathode layer 4, layered in this order, and the area of solid electrolyte layer 3 and anode layer 2 is larger than the area of cathode layer 4. Also, in all solid state battery 10 of the present disclosure, the filling rate of anode layer 2 is 80% or more, the filling rate of solid electrolyte layer 3 is 70% or more, and the filling rate of cathode layer 4 is 75% or more. Further, in all solid state battery 10 of the present disclosure, solid electrolyte layer 3 extends to all an outer peripheral part of cathode layer 4 in planar view.

Figure 7A:
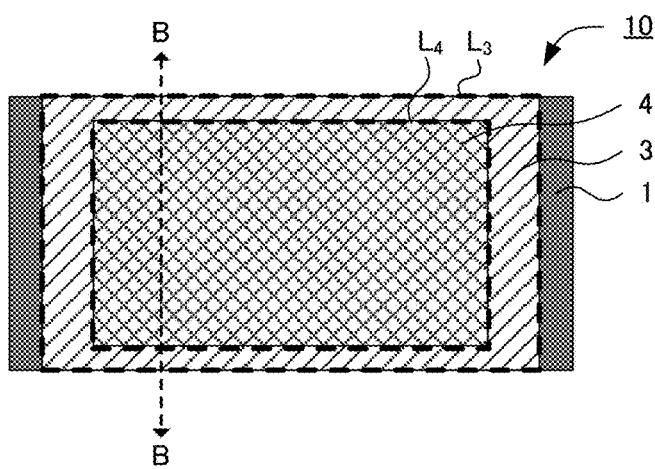
FIGS. 7A and 7B are explanatory drawings that explain the all solid state battery of the present disclosure.
Figure 7B:
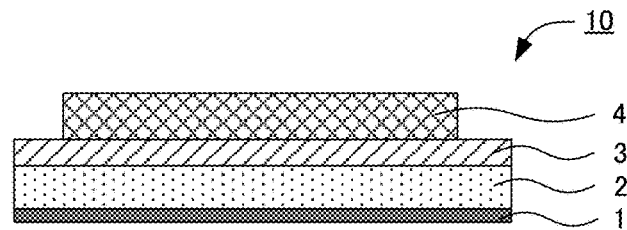

Here, "the solid electrolyte layer extends to all an outer peripheral part of the cathode layer in planar view" means as follows. First, FIG. 7A is a schematic planar view of the all solid state battery of the present disclosure, and FIG. 7B is a cross-sectional view of line B-B in FIG. 7A. For example, as shown in FIG. 7A, when all solid state battery 10 of the present disclosure is viewed in planar view, the outer periphery (broken line $L_3$) of solid electrolyte layer 3 is larger than the outer periphery (broken line $L_4$) of cathode layer 4; it means there is a region where solid electrolyte layer 3 does not overlap with cathode layer 4 in all the peripheral part of cathode layer 4 (the region surrounded with two broken lines in FIG. 2). Incidentally, as FIG. 7A is a planar view, although solid electrolyte 3 is just explained, as shown in FIG. 7B, since solid electrolyte layer 3 is layered on anode layer 2, the same manner as solid electrolyte layer 3 can be applied to anode layer 2.

The present disclosure provides an all solid state battery in which the slippage of the solid electrolyte layer and the anode layer from the anode foil is inhibited. The present disclosure has a problem to solve that the anode layer and solid electrolyte layer slip off from the anode foil, as described in the section "A. All solid state battery" above. To solve the problem, the all solid state battery to be obtained in the present disclosure is an all solid state battery in which the solid electrolyte layer extends in all the peripheral part of the cathode layer in planar view. In specific, the problem occurs, as shown in FIGS. 13A and 13B, when the layered body, in which anode foil 1, anode layer 2, solid electrolyte layer 3, and cathode layer 4 are layered, is pressurized. Since the filling rate of each member in all solid state battery 10 of the present disclosure is a specific value or more, it can be said that the battery is in a state a specific pressure is applied thereto. Meanwhile, it can be said that although the all solid state battery of the present disclosure is in the state the specific pressure is applied thereto, the solid electrolyte layer extends in all the peripheral parts of the cathode layer to inhibit occurrence of the slippage of the anode layer and the solid electrolyte layer from the anode foil.

In some embodiments of the all solid state battery of the present disclosure, the adhesive force between the anode foil and the anode layer is 30 N/cm$^2$ or more. As described in the section "A. Method for producing all solid state battery" above, when the adhesive force between the anode foil and the anode layer is 30 N/cm$^2$ or more, the above described effect can be sufficiently obtained. Also, in the present disclosure, the adhesive force of 30 N/cm$^2$ or more between the anode foil and the anode layer can be achieved by, for example, roll-pressing the layered body in which an anode foil and the anode layer are layered, with a linear pressure of 1.0 t/cm or more.

Figure 8:
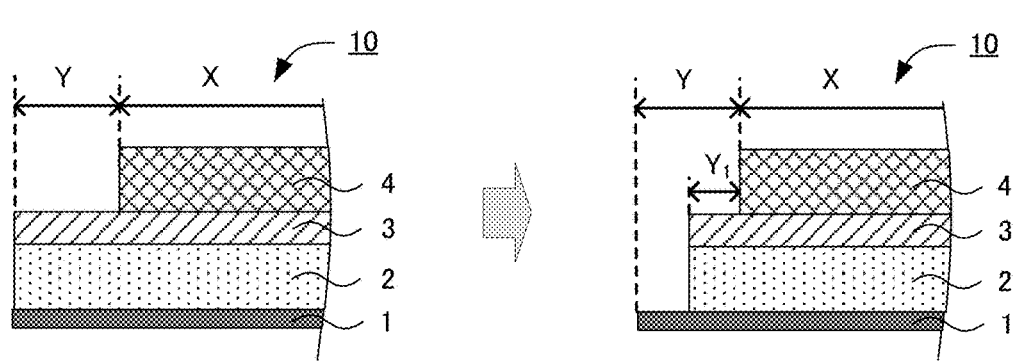
FIG. 8 is an explanatory drawing that explains the all solid state battery of the present disclosure.

In some embodiments of the all solid state battery of the present disclosure, the solid electrolyte layer extends 100 μm or more in all the peripheral part of the cathode layer in planar view. Here, "the solid electrolyte layer extends 100 μm or more in all the peripheral part of the cathode layer in planar view" means as follows. FIG. 8 is a schematic view illustrating a state before the anode layer and the solid electrolyte layer slip off from the anode foil (right figure), and a state after the anode layer and the solid electrolyte layer slip off from the anode foil (left figure). "The solid electrolyte layer extends 100 μm or more in all the peripheral parts of the cathode layer in planar view" means, as shown in the left figure of FIG. 8, at least distance $Y_1$ where solid electrolyte layer 3 is exposed is 100 μm or more even when anode layer 2 and solid electrolyte layer 3 slip off from anode foil 1. In the present disclosure, in planar view, in all the peripheral part of the cathode layer, the solid electrolyte layer may, for example, extend 200 μm or more, may extend 300 μm or more, and may extend 400 μm or more. The reason therefor is to sufficiently inhibit the contact of the cathode layer with the anode layer even when an active material is expanded or contracted, and thereby short circuit can be efficiently prevented.

In the present disclosure, the filling rate of the anode layer in the region that overlaps with the cathode layer in planar view is 90% or more, the filling rate in the region that does not overlap with the cathode layer in planar view is 80% or more, and the filling rate of the solid electrolyte layer in the region that overlaps with the cathode layer in planar view may be 90% or more. Incidentally, the above specification signifies as follows. That is, as shown in FIG. 6, since the filling rate of end part 2Y of anode layer 2 is lower than that of central part 2X of anode layer 2, it is specified that the pressure is applied in the thickness direction after cathode layer 4 is layered (the second pressing step in the section "A. Method for producing all solid state battery" above). Also, in all solid state battery 10 of the present disclosure, since the filling rate of end part 2Y of anode layer 2 is 80% or more, it is specified that the pressure was applied to the layered body in which anode layer 2 is layered on anode foil 1, or the layered body in which anode foil 1, anode layer 2, and solid electrolyte layer 3 are layered (the first pressing step in the section "A. Method for producing all solid state battery" above).

1. Anode Foil

The anode foil of the present disclosure may be in the same contents as those described in the section "A. Method for producing all solid state battery 1. First pressing step (1) Anode foil" above; thus, the descriptions herein are omitted.

2. Anode Layer

The filling rate of the anode layer in the present disclosure is 80% or more. In some embodiments, the filling rate of the anode layer in the region that overlaps with the cathode layer in planar view may be 90% or more. Here, in the anode layer, "the region that overlaps with the cathode layer in planar view" refers to, for example, the region indicated by reference sign 2X in FIG. 6. The region in the anode layer that overlaps with the cathode layer may be hereinafter referred to as just the central part in the anode layer and explained in some cases. The filling rate of the central part in the anode layer may be, for example, 93% or more, and may be 95% or more. Meanwhile, the filling rate of the anode layer in the region that does not overlap with the cathode layer in planar view is 80% or more. Here, in the anode layer, "the region that does not overlap with the cathode layer in planar view" refers to, for example, the region indicated by reference sign 2Y in FIG. 6, which is the region exposed from the cathode layer in planar view. The region in the anode layer that does not overlap with the cathode layer may be hereinafter referred to as just the end part in the anode layer and explained in some cases. The filling rate of the end part in the anode layer may be, for example, 85% or more, and may be 90% or more. Incidentally, the method for measuring the filling rate may be in the same manner as in Examples described later; thus, the description herein is omitted.

Other features of the anode layer may be in the same contents as those described in the section "A. Method for producing all solid state battery 1. First pressing step (2) Anode layer" above; thus, the descriptions herein are omitted.

3. Solid Electrolyte Layer

The filling rate of the solid electrolyte layer of the present disclosure is 70% or more. In some embodiments, the filling rate of the solid electrolyte layer in the region that overlaps with the cathode layer in planar view may be 90% or more. Here, in the solid electrolyte layer, "the region that overlaps with the cathode layer in planar view" refers to, for example, the region indicated by reference sign 3X in FIG. 6. The region in the solid electrolyte layer that overlaps with the cathode layer may be hereinafter referred to as just the central part of the solid electrolyte layer and explained in some cases. The filling rate of the central part in the solid electrolyte layer may be, for example, 93% or more. Meanwhile, the filling rate of the solid electrolyte layer in the region that does not overlap with the cathode layer is, for example 70% or more. Here, in the anode layer, "the region that does not overlap with the cathode layer in planar view" refers to, for example, the region indicated by reference sign 3Y in FIG. 6, which is the region exposed from the cathode layer in planar view. The region in the solid electrolyte layer that does not overlap with the cathode layer may be hereinafter referred to as just the end part of the solid electrolyte layer and explained in some cases. The filling rate of the end part in the solid electrolyte layer may be, for example, 80% or more, and may be 85% or more. Incidentally, the method for measuring the filling rate may be in the same manner as in Examples described later; thus the description herein is omitted.

Other features of the solid electrolyte layer may be in the same contents as those described in the section "A. Method for producing all solid state battery 1. First pressing step (3) Solid electrolyte layer" above; thus, the descriptions herein are omitted.

4. Cathode Layer

The filling rate of the cathode layer in the present disclosure is 75% or more. The filling rate of the cathode layer is, for example, 80% or more, and may be 85% or more. Incidentally, the method for measuring the filling rate may be in the same manner as in Examples described later; thus the description herein is omitted.

Other features of the cathode layer may be in the same contents as those described in the section "A. Method for producing all solid state battery 2. Layered body forming step" above; thus, the descriptions herein are omitted.

5. Other Constitutions

The all solid state battery may be provided with, for example, a cathode current collector (cathode foil) for collecting currents of the cathode layer, and a battery case for storing the above described members configured in the all solid state batter, as the other constitutions. Incidentally, the cathode current collector and the battery case configured in the all solid state battery may be the same as the members used for a general all solid state battery; thus, the descriptions herein are omitted.

6. All Solid State Battery

The all solid state battery of the present disclosure may be a primary battery and may be a secondary battery, for example, a secondary battery to be repeatedly charged and discharged and useful as a car-mounted battery. Examples of the shape of the all solid state battery may include a coin shape, a laminate shape, a cylindrical shape, and a square shape. Also, the all solid state battery of the present disclosure may be a layered battery in which a plurality of power generating element including a cathode layer, a solid electrolyte layer, and an anode layer, are layered. The layered battery may be a battery in which each power generating element is connected in parallel, and may be a battery in which each power generating element is connected in series.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

The present disclosure is hereinafter explained in further details with reference to Examples.

Examples 1 to 7 and Comparative Examples 1 to 3

Figure 9:
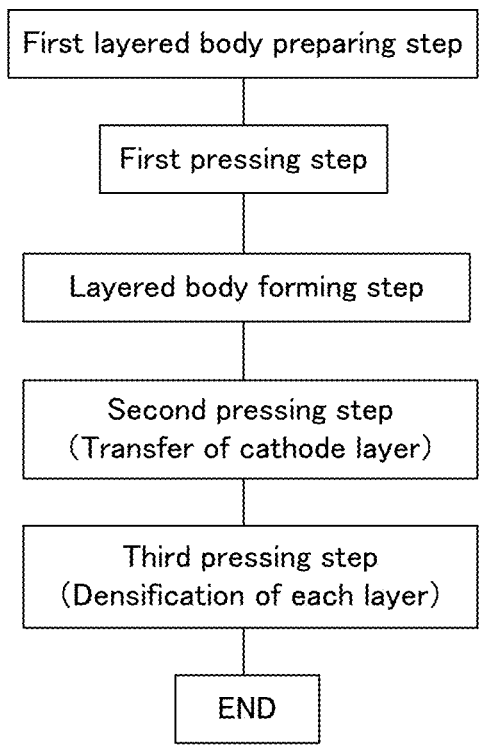
FIG. 9 is a flow chart that shows a method for producing an all solid state battery in Examples.

An all solid state battery was fabricated by the method shown in FIG. 9 and below.

Fabrication of Paste for Cathode Layer

Butyl butyrate, butyl butyrate solution in which polyvinylidene fluoride was dissolved, $LiNi_{1/3}CO_{1/3}Mn_{1/3}O_2$ (average particle size 4 μm) as the cathode active material, $Li_2S$—$P_2S_5$-based glass ceramic (average particle size 0.8 μm) including LiI as the sulfide solid electrolyte, and VGCF as the conductive material were put in a container and stirred using fill-mix dispersion apparatus. Thereby, a paste for cathode layer was obtained.

Fabrication of Paste for Anode Layer

Butyl butyrate, butyl butyrate solution in which polyvinylidene fluoride was dissolved, Si (average particle size 5 μm), and $Li_2S$—$P_2S_5$-based glass ceramic (average particle size 0.8 μm) including LiI as the sulfide solid electrolyte were put in a container and stirred for 30 seconds using ultrasonic dispersion apparatus. Thereby, a paste for anode layer was fabricated.

Fabrication of Paste for Solid Electrolyte Layer

Heptane, heptane solution (5 wt %) in which polyvinylidene fluoride was dissolved, and $Li_2S$—$P_2S_5$-based glass ceramic (average particle size 0.8 μm) including LiI as the sulfide solid electrolyte were put in a container and stirred for 30 seconds using ultrasonic dispersion apparatus. In this manner, a paste for solid electrolyte layer was obtained.

Fabrication of Cathode Layer

The obtained paste for cathode layer was pasted on an aluminum foil by a blade method, and then dried for 30 minutes on a hot plate heated to 100° C. to fabricate a cathode layer.

Fabrication of Anode Layer and Solid Electrolyte Layer

The obtained paste for anode layer was pasted on one surface of a copper foil (anode foil) by a blade method, and right after that, the obtained paste for solid electrolyte layer was pasted on the paste for anode layer. After that, the product was dried for 30 minutes on a hot plate heated to 100° C. to form an anode layer and a solid electrolyte layer in film. Next, an anode layer and a solid electrolyte layer are formed in film in the same manner as above on the other surface of the copper foil. Thereby, a first layered body in which the solid electrolyte layer, the anode layer, the anode foil, the anode layer, and the solid electrolyte layer are layered in this order, was obtained.

First Pressing Step

The first layered body including the anode foil, the anode layer (filling rate: 55%), and the solid electrolyte layer (filling rate: 60%), was pinched with a 0.1 mm thick SUS plate, and roll-pressed with the specific linear pressure and temperature condition to obtain a second layered body. Incidentally, the linear pressure and the temperature condition are shown in Table 1. As shown in Table 1, the filling rate of the anode layer was 85% or more, and the filling rate of the solid electrolyte was 80% or more after roll-pressing with the linear pressure of 1.0 t/cm² or more in the first pressing step.

Layered Body Forming Step and Second Pressing Step

After the first pressing step, a third layered body in which the cathode layer formed in film is overlapped with the solid electrolyte layer was pinched with a 0.1 mm thick SUS plate, roll-pressed with the linear pressure of 1.3 t/cm and temperature of 25° C., to obtain a fourth layered body. After that, the aluminum foil was peeled off from the cathode layer.

Third Pressing Step: Densification

After the second pressing step, the fourth layered body including the anode foil, the anode layer, the solid electrolyte layer, and the cathode layer, was pinched with a 0.1 mm thick SUS plate, and roll-pressed with linear pressure of 5 t/cm and temperature of 170° C. Thereby, each layer was densified. After the densification by the third pressing step, the filling rate of the cathode layer was 90%, and the filling rate of the anode layer in the region overlapped with the cathode layer in planar view was 97%, and the filling rate of the solid electrolyte layer in the region overlapped with the cathode layer in planar view was 89%.

[Evaluation]

Adhesive Force Measurement

A punching tool with the diameter of 11.28 mm was used to punch the anode layer and the solid electrolyte layer after the first pressing step, and a test of pulling in vertical direction was conducted using a double sided tape with the diameter of 10 mm. The pulling speed was 40 rum/min, and the average value of 3 times measured was determined as the adhesive force between the anode foil and the anode layer. The results are shown in Table 1 and FIG. 10.

Slippage Occurrence

Figure 11A:
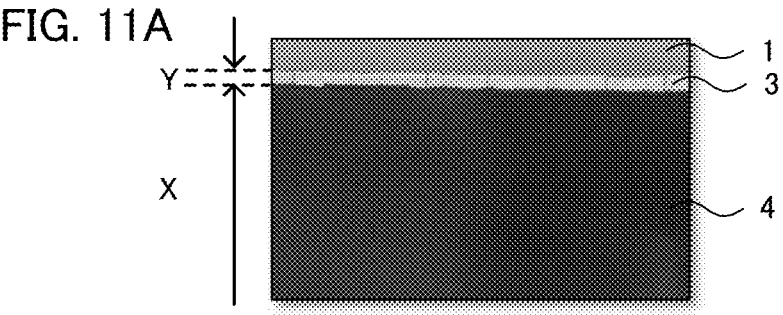
FIGS. 11A to 11C are images of observing whether the slippage of the anode layer and the solid electrolyte layer from the anode foil occurred in Examples.
Figure 11B:
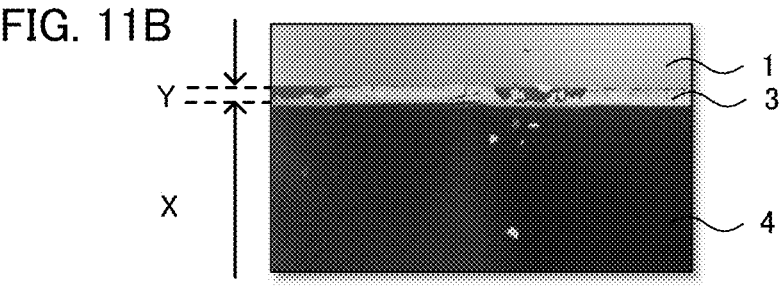
Figure 11C:
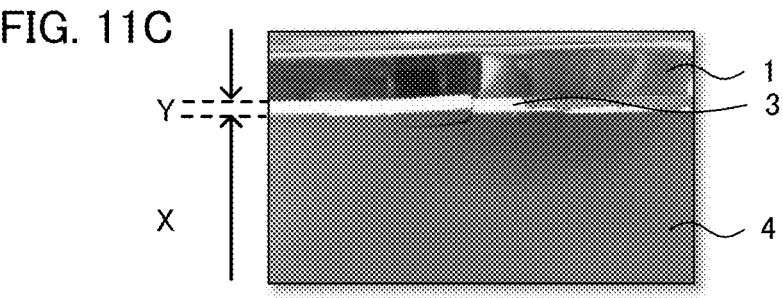

After the third pressing step, whether the anode layer and the solid electrolyte layer were slipped off from the anode foil or not was visually confirmed. The results are shown in Table 1 and FIGS. 11A to 11C. Incidentally, FIG. 11A is the photo of the all solid state battery obtained in Example 1, and FIG. 11B is the photo of the all solid state battery obtained in Comparative Example 1, and FIG. 11C is the photo of the all solid state battery obtained in Comparative Example 2. The reference signs shown in FIGS. 11A to 11C are the same as the reference signs shown in, for example, FIG. 2.

TABLE 1

|  | First pressing | | | |
| --- | --- | --- | --- | --- |
|  | Linear pressure (t/cm) | Temperature (° C.) | Adhesive force (Anode foil/Anode layer) (N/cm²) | Slippage occurrence |
| Comparative Example 1 | — | — | 1.2 | Present |
| Comparative Example 2 | 0.2 | 25 | 4.3 |  |
| Comparative Example 3 | 0.7 | 25 | 28.4 |  |
| Example 1 | 1.0 | 25 | 58.9 | None |
| Example 2 | 1.1 | 25 | 51.1 |  |
| Example 3 | 1.2 | 25 | 56.1 |  |
| Example 4 | 1.3 | 25 | 52.7 |  |
| Example 5 | 1.3 | 100 | 60.2 |  |
| Example 6 | 1.3 | 140 | 52.8 |  |
| Example 7 | 1.3 | 170 | 46.7 |  |

Figure 10:
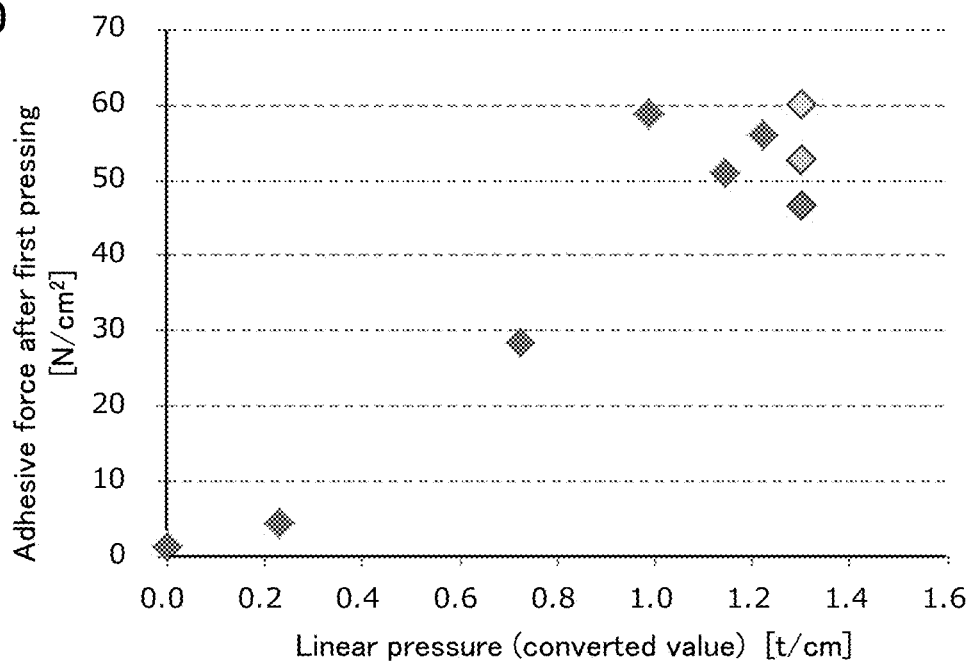
FIG. 10 is the result of the adhesive force measured for the anode layer and the solid electrolyte layer in Examples.

As shown in Table 1 and FIG. 10, the first pressing step conducted with the linear pressure of 1 t/cm or more improved the adhesive force between the anode foil and the anode layer; the all solid state battery without the slippage of the anode layer and the solid electrolyte layer from the anode foil was obtained even in the case the third pressing step was conducted.

REFERENCE SIGNS LIST 1 anode foil
2 anode layer
3 solid electrolyte layer
4 cathode layer
10 all solid state battery

What is claimed is:

1. A method for producing an all solid state battery to produce an all solid state battery in which an anode foil, an anode layer, a solid electrolyte layer, and a cathode layer are layered in this order, and an area of the solid electrolyte layer and the anode layer is larger than an area of the cathode layer; the method comprising:
 a first pressing step of roll-pressing a first layered body that is a layered body in which the anode foil and the anode layer are layered, or a layered body in which the anode foil, the anode layer, and the solid electrolyte layer are layered, so as adhesive force between the anode foil and the anode layer becomes 30 N/cm² or more, to form a second layered body;
 a layered body forming step of forming a third layered body comprising the anode foil, the anode layer, the solid electrolyte layer, and the cathode layer, using the second layered body; and
 a second pressing step of roll-pressing the third layered body with a linear pressure of 1.0 t/cm or more to form a fourth layered body.

2. The method for producing the all solid state battery according to claim 1, wherein the first pressing step is a step of roll-pressing with a linear pressure of 1.0 t/cm or more.

3. The method for producing the all solid state battery according to claim 1, wherein the second pressing step is a step of roll-pressing with a linear pressure of 5.0 t/cm or less.

4. An all solid state battery comprising an anode foil, an anode layer, a solid electrolyte layer, and a cathode layer, layered in this order, and an area of the solid electrolyte layer and the anode layer is larger than an area of the cathode layer; wherein
 a filling rate of the anode layer is 80% or more, and the filling rate of the anode layer in a region that overlaps with the cathode layer in planar view is greater than the filling rate of the anode layer in a region that does not overlap with the cathode layer in planar view;
 a filling rate of the solid electrolyte layer is 70% or more;
 a filling rate of the cathode layer is 75% or more; and
 the solid electrolyte layer extends to all an outer peripheral part of the cathode layer in planar view.

5. The all solid state battery according to claim 4, wherein an adhesive force between the anode foil and the anode layer is 30 N/cm² or more.

6. The all solid state battery according to claim 4, wherein the solid electrolyte layer extends 100 μm or more to all an outer peripheral part of the cathode layer in planar view.

7. The all solid state battery according to claim 4, wherein the filling rate of the anode layer in a region that overlaps with the cathode layer in planar view is greater than the filling rate of the solid electrolyte layer in a region that overlaps with the cathode layer in planar view.

8. The method for producing the all solid state battery according to claim 1, wherein a filling rate of the anode layer is 80% or ore, and the filling rate of the anode layer in a region that overlaps with the cathode layer in planar view is greater than the filling rate of the anode layer in a region that does not overlap with the cathode layer in planar view.

* * * * *